United States Patent [19]

Seita et al.

[11] 4,035,558

[45] July 12, 1977

[54] PROCESS FOR PRODUCING ORGANIC-INORGANIC POLYION COMPLEX

[75] Inventors: Toru Seita; Akihiko Shimizu, both of Shin-nanyo, Japan

[73] Assignee: Toyo Soda Manufacturing Co., Ltd., Yamaguchi, Japan

[21] Appl. No.: 713,648

[22] Filed: Aug. 12, 1976

[30] Foreign Application Priority Data

Aug. 20, 1975 Japan .............................. 50-100228

[51] Int. Cl.$^2$ .......................................... C08F 8/00
[52] U.S. Cl. ..................................... 526/29; 526/14; 526/16; 526/17; 526/18; 526/23

[58] Field of Search ................. 526/29, 16, 17, 18, 526/23, 14

[56] References Cited

U.S. PATENT DOCUMENTS

| 2,411,899 | 5/1945 | Semegren ............................ 526/29 |
| 3,969,334 | 7/1976 | Shimizu et al. ....................... 526/29 |

*Primary Examiner*—William F. Hamrock
*Attorney, Agent, or Firm*—Oblon, Fisher, Spivak, McClelland & Maier

[57] ABSTRACT

An organic-inorganic polyion complex is prepared by reacting a polycation polymer with an alkali silicate in the presence of a solvent.

10 Claims, No Drawings

PROCESS FOR PRODUCING ORGANIC-INORGANIC POLYION COMPLEX

BACKGROUND OF THE INVENTION

The present invention relates to a process for producing polyion complexes by reacting a polycation polymer with an inorganic compound in various solvents. Various polyion complexes have been disclosed in the prior art as follows.

1. Polyion complexes prepared by reacting a polystyrenesulfonate with a polyvinylbenzyltrimethyl ammonium salt [Ind. Eng. Chem., 57, (10), 32 (1965)].
2. Polyion complexes prepared by reacting polyglutaminic acid with polylysine [Nihon Kagaku Zasshi 82 (5), 597 (1951)].
3. Polyion complexes prepared by reacting an anionic partial substituent of polyvinyl alcohol with polyvinyl pyridine. (Japanese Unexamined Patent Publication No. 21221/1961).
4. A process for preparing polyion complexes (Japanese Unexamined Patent Publication No. 29830/1963).
5. Polyion complexes of polysaccharide derivatives (Japanese Unexamined Patent Publication No. 59181/1963).
6. Polyelectrolyte complexes derived from polyvinyl alcohol and a process for preparing a film or fiber therefrom (Japanese Unexamined Patent Publication No. 66004/1963).

As is evident from the subject matter of the above references, most of the known polyion complexes are organic-organic polyion complexes. In general, inorganic materials have the advantages of having very good flameproofing properties as well as high dimensional stability, but have the disadvantages of being brittle and having relatively low strength. On the other hand, organic polymers have softness and elasticity and relatively high strength in comparison to inorganic materials. However, the organic polymers have the disadvantages of not having food flameproofing properties and not having good dimensional stability. In order to overcome the disadvantages of both materials with the advantageous features of both materials, it has been proposed to introduce an inorganic material into an organic polymer. In one method of preparing such a material the inorganic material has been introduced into the organic polymer by blending or coprecipitating both components whereby a product is obtained which exhibits improved strength characteristics such as improved tensile strength and an improvement in the decrease of yield elongation. However, the above-described disadvantages of organic and inorganic materials could not be overcome by this technique when the materials were either blended or coprecipitated. When the organic polymer and inorganic materials are blended by the conventional method, it is difficult to uniformly blend the materials and thus an improved preparative technique is required.

A study has therefore been conducted for a method by which an inorganic material can be blended with an organic polymer in a macro-uniform form.

SUMMARY OF THE INVENTION

Accordingly, one object of the present invention is to provide a polyion complex wherein an inorganic material is uniformly introduced into an organic polymer thereby forming a product having special characteristics, especially crosslinkable characteristics.

This object and other objects of the present invention can be attained by reacting a polycation polymer with an alkali silicate in the presence of a solvent. The polycation polymer can have the structures shown in the repeating unit formulas below.

DETAILED DESCRIPTION OF THE PREFERRED EMBODIMENTS

Silica gel plastics have been prepared in the past from an aqueous solution of an alkali metal silicate with an acid. However, the use of an alkali metal silicate in the preparation of polyion complexes by reaction with a polycation polymer has not been considered. The polyion complexes prepared by the process of the present invention can be used in various fields such as in the preparation of membranes for dialysis, membranes for ultra-filtration, industrial fillers, improved moisture permeable plastics, electrically conductive substances, antistatic coating compositions and the like.

Suitable alkali metal silicates used in the process of the present invention include sodium salts, potassium salts and other alkali metal salts and also ammonium salts. The alkali silicates are generally referred to as water glass. The molar ratio of the alkali component to the silica component can be selected over a wide range of 0.1:1 to 1:1.1. The polycation polymers with which the silicates are reacted in the process of the invention have the following unit formulas.

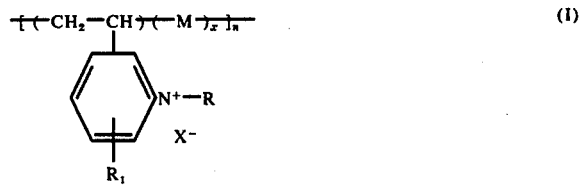

(I)

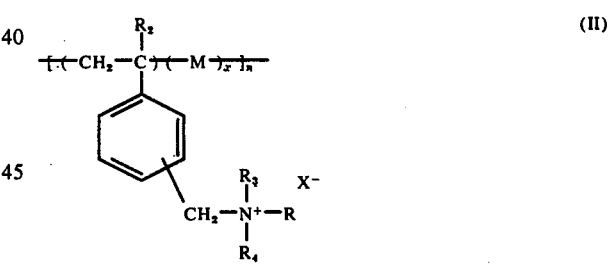

(II)

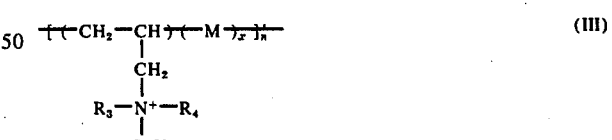

(III)

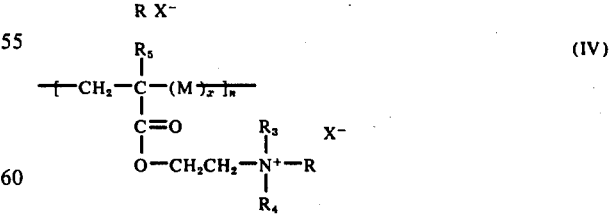

(IV)

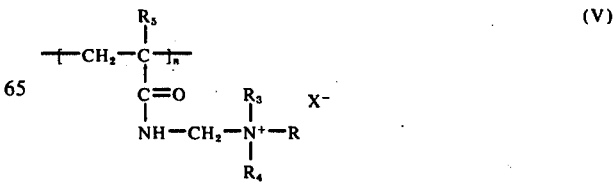

(V)

-continued

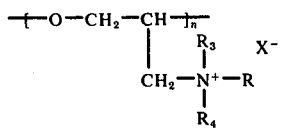

wherein R represents a $C_{1-10}$ hydrocarbon group, an alkylol group, a benzyl group or a phenylalkyl group; $R_1$ represents hydrogen or a $C_{1-4}$ hydrocarbon group; $R_2$ represents hydrogen or a $C_{1-2}$ alkyl group; $R_3$ and $R_4$ can be the same or different and can be a $C_{1-6}$ hydrocarbon group; $R_5$ represents hydrogen or methyl; X represents halogen or hydroxyl; M represents a vinyl monomer; $x$ represents 0 or an integer less than 40000 and $n$ represents an integer of 10 to 50000.

In the formulas (I) to (VI), the vinyl monomer component M can be any vinyl monomer as long as the polymer derived from the monomer has no polyelectrolyte characteristics. Suitable vinyl monomers include styrene, styrene derivatives such as α-methyl stryene, acrylonitrile, acrylonitrile derivative such as methacrylonitrile; and dienes such as butadiene and the like. In the process for preparing the polyion complexes of the present invention, a solution of an alkali silicate is mixed with a solution of a polycation polymer. Suitable alkali silicates include water glass ($Na_2O.NSiO_2$:n=2-4), especially $Na_2O.3SiO_2$. Suitable solvents used in the process of the invention include water, and water compatible organic solvents such as methanol, ethanol, N,N-dimethylformamide and the like.

The objectives of the invention can be attained by using a mixed solvent of two or more components. When the reaction is conducted in an aqueous solution, it is possible to choose a pH over a wide range depending upon the purposes and requirements of the product and is preferably in a range of 9.5 to 14. If the concentration of alkali silicate is too high, the polyion complex cannot be obtained. Accordingly, it is necessary to carefully control the concentration of alkali silicate. It is believed that when high concentrations of alkali silicate are used, problems are caused by an increase of alkali in the system. The concentration of the alkali silicate can be in a range of 0.01 to 30 wt.%, preferably 0.1 to 10 wt.%. On the other hand, the concentration of the polycation polymer can be in a range of 0.01 to 80 wt.%, preferably 0.1 to 20 wt.%.

The polyion complexes prepared by the process of the invention have various forms depending upon the pH of the reaction solution and the concentrations of the reactants in the reaction. Accordingly, a polyion complex having the desired form can be obtained by selecting the appropriate pH and concentration conditions. In the reaction, a solution of an alkali silicate is mixed with a solution of the polycation polymer. In the mixing step, the silicate can be added to the polycation polymer or vice versa. Preferably, a solution of the polycation polymer is added to the solution of an alkali silicate. The temperature in the mixing step can be in a range of 0° to 90° C, preferably room temperature to 50° C. The polyion complexes prepared by the process of the present invention are white or pale brown solid materials.

Having generally described this invention, a further understanding can be obtained by reference to certain specific examples which are provided herein for purpose of illustration only and are not intended to be limiting unless otherwise specified.

EXAMPLE 1

A solution was prepared by completely dissolving 12 g of a polycation polymer having the formula

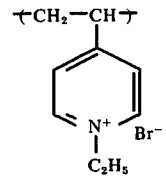

and having a quaternary degree of 85% and a molecular weight of $1 \times 10^5$ in 1 liter of water. A solution was separately prepared by completely dissolving 80 g of sodium silicate (Japanese Industrial Standard No. 3) (20% aqueous solution, viscosity 8.5 cps) in 2 liters of water. The solution of the polycation polymer was added to the solution of sodium silicate with vigorous stirring at room temperature whereby a white precipitate formed. After the addition of the reactant, stirring was continued for 1 hour. After storing the solution for one day, the precipitate was filtered and washed with water and then with acetone and dried in a vacuum. The yield of the product was 18 g. According to an infrared spectrum analysis of the product, ether bands of Si-O- at 1060 cm$^{-1}$ and 750 cm$^{-1}$ and a band indicative of a pyridine ring at 1620 cm$^{-1}$ were found. Accordingly, this evidence confirmed the material as a polyion complex.

EXAMPLE 2

The process of Example 1 was conducted except that the pH was adjusted to 10 by adding 1N-HCl to the solution of sodium silicate. The reaction and the same post-treatment sequence were conducted. The yield of the polyion complex was 17 g and the polyion complex had a higher elasticity in comparison to the polyion complex of Example 1.

EXAMPLE 3

A solution was prepared by completely dissolving 20 g of the polycation polymer (quaternary degree 72%; molecular weight 2.5×10$^5$) in 2.5 liters of water. Another solution was separately prepared by completely dissolving 100 g of the sodium silicate of Example 1 in 3 liters of water. The solution of polycation polymer was added to the solution of sodium silicate with stirring at room temperature. After the addition, the mixed solutions were further stirred for about 1 hour. After storing the solution for one day, the precipitate was filtered and washed with water and then with acetone and dried in vacuum. The yield of the product was 30 g. According to an infrared spectrum analysis of the product, ether bands of Si-O- at 1060 cm$^{-1}$ and 750 cm$^{-1}$ were found as well as bands at 885 cm$^{-1}$ and 835 cm$^{-1}$ indicative of a substituted benzene ring. Accordingly, the spectrum confirmed the synthesis of the polyion complex.

Examples 4 to 7

A solution of each of the polycation polymers shown in Table 1 at a concentration of 0.8 wt.% was prepared in accordance with the process of Example 1. A series of solutions of sodium silicate (0.8 wt.%) was prepared in accordance with the process of Example 1 and the pH of each solution was adjusted as shown in Table 1 with 1N-HCl in the manner of Example 2. Each reaction and its post-treatment sequence were conducted in accordance with the process of Example 1 whereby the desired polyion complexes were obtained. The results are shown in Table 1.

POLYCATION POLYMERS USED IN EXAMPLES 4 TO 7

Example 4       Formula I

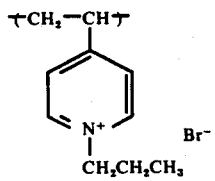

Example 5       Formula II

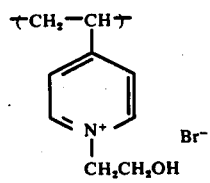

Example 6       Formula III

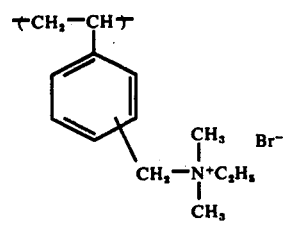

Example 7       Formula IV

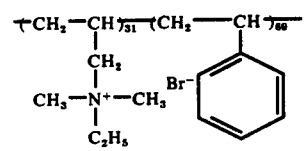

TABLE 1

| Example | 4 | 5 | 6 | 7 |
|---|---|---|---|---|
| Polycation polymer structure | I | II | III | IV |
| quaternary degree | 62 | 92 | 87 | 83 |
| M.W. | $1 \times 10^5$ | $1 \times 10^5$ | $2.5 \times 10^5$ | $1.2 \times 10^4$ |
| Amount(g) | 18 | 20 | 20 | 32 |
| Sodium silicate pH | 10 | 12 | 10.5 | 10 |
| amount | 70 | 130 | 120 | 80 |
| Polyion complex Appearance | white powder | pale brown powder | pale brown powder | white powder |
| Yield(g) | 27 | 38 | 32 | 22 |

We claim:
1. In a process for producing an organic-inorganic polyion complex by reacting a polycation polymer with an alkali silicate in the presence of a solvent, the improvement comprising:
reacting said silicate with a polycation polymer having repeating units selected from the group consisting of:

$$\substack{\text{–}(\text{CH}_2\text{–CH})\text{–}(\text{M})_x\text{–}]_n\\ \text{–C}_6\text{H}_4\text{–N}^+\text{–R}\ \ X^-\\R_1}$$ (I)

$$\text{(II)}$$

$$\text{(III)}$$

$$\text{(IV)}$$

wherein R represents a $C_{1-10}$ hydrocarbon group, an alkylol group, benzyl or phenylalkyl; $R_1$ represents hydrogen or a $C_{1-4}$ hydrocarbon group; $R_2$ represents hydrogen or a $C_{1-2}$ alkyl group; $R_3$ and $R_4$ can be the same or different and each represents a $C_{1-6}$ hydrocarbon group; $R_5$ represents hydrogen or methyl; X represents halogen or hydroxyl; M represents a vinyl monomer; x represents 0 or an integer of less than 40,000 and n represents an integer from 10 to 50,000.

2. The process of claim 1, wherein the alkali silicate is an alkali metal or ammonium silicate.

3. The process of claim 2, wherein said alkali metal silicate is potassium or sodium silicate.

4. The process of claim 1, wherein the alkali silicate is $Na_2O - NSiO_2$, wherein n is 2 to 4.

5. The process of claim 1, wherein the polycation polymer is a polyelectrolyte having a basic ionizing group.

6. The process of claim 1, wherein the polycation polymer is a polyelectrolyte which has a main chain and branched chains having quaternary ammonium groups.

7. The process of claim 1, wherein the solvent is water, a water compatible solvent or mixtures thereof.

8. The process of claim 1, wherein a solution of the polycation polymer is admixed with a solution of the alkali silicate at a concentration of 0.01 to 30 wt% at 0° to 90° C.

9. The process of claim 1, wherein the pH of the reaction solution ranges from 9.5 to 14.

10. An organic-inorganic polyion complex prepared by the process set forth in claim 1.

* * * * *